United States Patent [19]

Helder et al.

[11] 4,032,414

[45] June 28, 1977

[54] ELECTROPLATING DEVICE AND METHOD FOR THE PARTIAL PLATING OF TWO-ROW PIN STRIPS

[75] Inventors: Johan Helder, Brugge, Belgium; Karl Holzinger, Munich, Germany; Gerd Guegel, Berlin, Germany; Heinz Liebler, Berlin, Germany; Wolfgang Pernegger, Erlangen, Germany

[73] Assignee: Siemens Aktiengesellschaft, Berlin & Munich, Germany

[22] Filed: Dec. 1, 1975

[21] Appl. No.: 636,427

[30] Foreign Application Priority Data

Dec. 20, 1974 Germany .......................... 2460694

[52] U.S. Cl. .................................. 204/15; 204/202; 204/224 R
[51] Int. Cl.² ...................... C25D 5/02; C25D 5/08; C25D 17/06; C25D 17/28

[58] Field of Search ........................ 204/198–205, 204/206, 28, 273, 237, 15, 224 R

[56] References Cited

UNITED STATES PATENTS

| | | | |
|---|---|---|---|
| 3,573,186 | 3/1971 | Ryerson et al. ................... | 204/198 |
| 3,657,097 | 4/1972 | Baldock et al. .................... | 204/202 |
| 3,878,062 | 4/1975 | Grimaldi et al. ................... | 204/202 |
| 3,897,323 | 7/1975 | Schlotthauer ..................... | 204/198 |

Primary Examiner—T. M. Tufariello
Attorney, Agent, or Firm—Hill, Gross, Simpson, Van Santen, Steadman, Chiara & Simpson

[57] ABSTRACT

A device for the partial electro plating of two-row pin strips utilizing an endless chain of pin strip carrying transfer carriages to move the pin strips through a succession of treatment areas, the pin strips being automatically fed onto the carriages in electrical conductive contact therewith and being automatically stripped from the carriages upon termination of processing.

10 Claims, 7 Drawing Figures

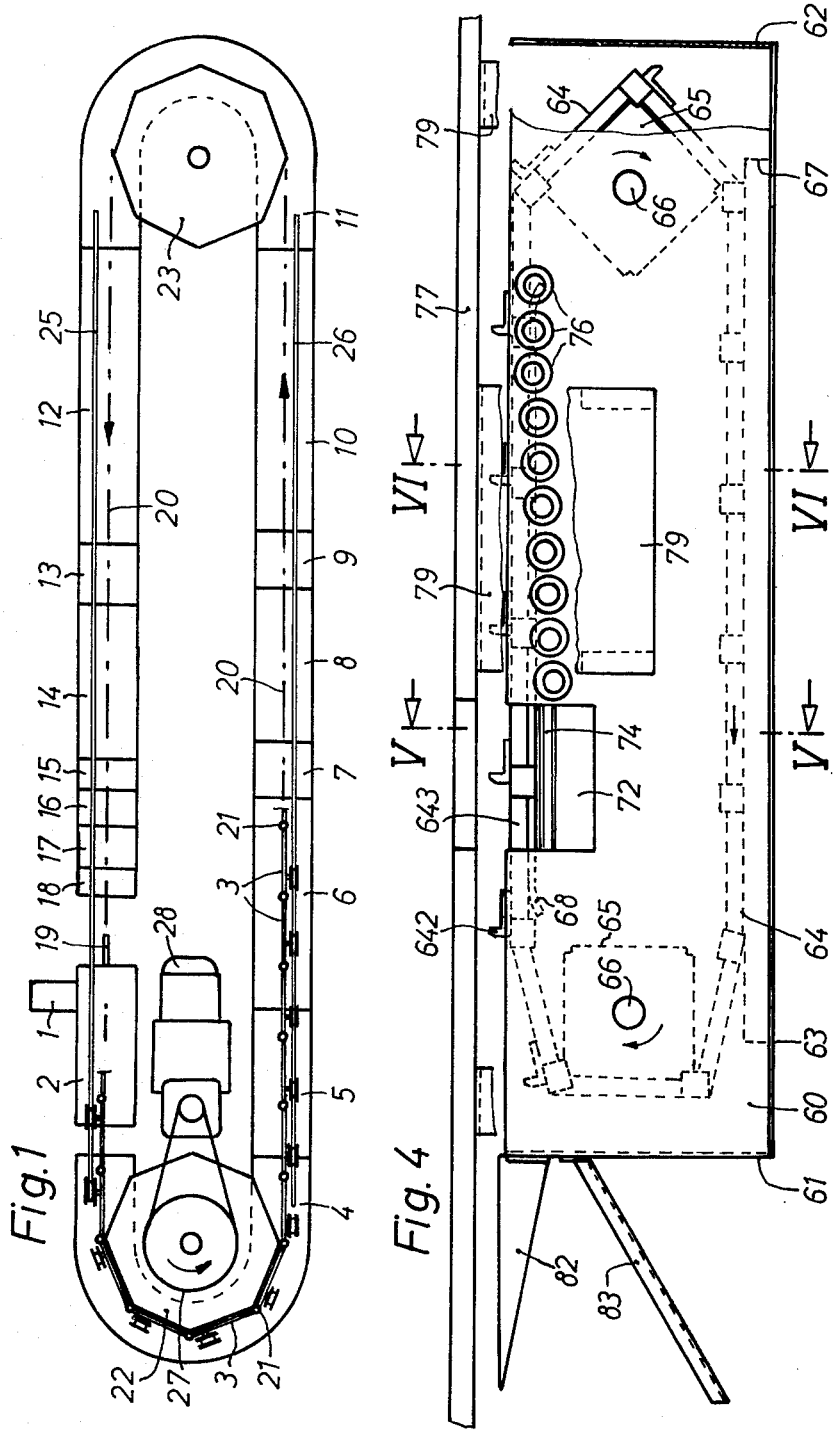

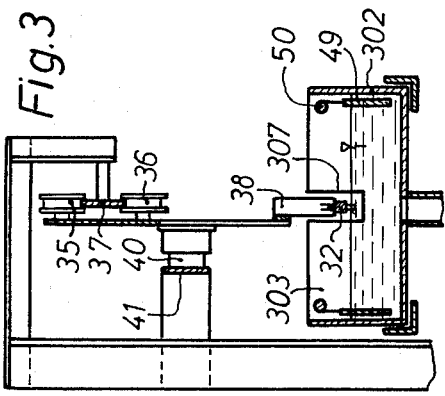
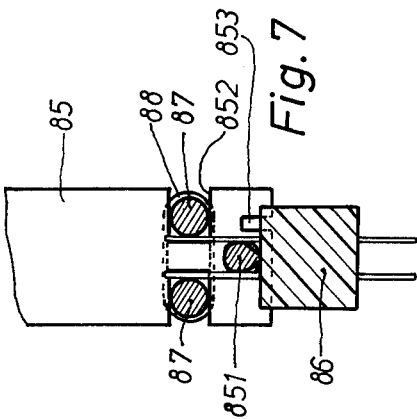
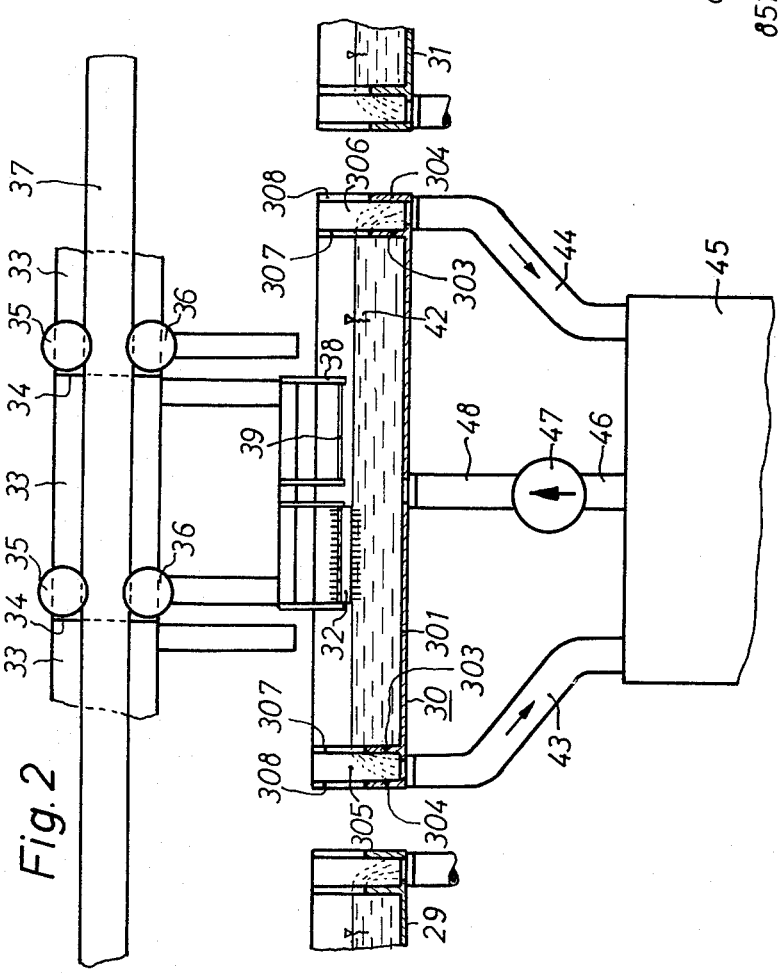

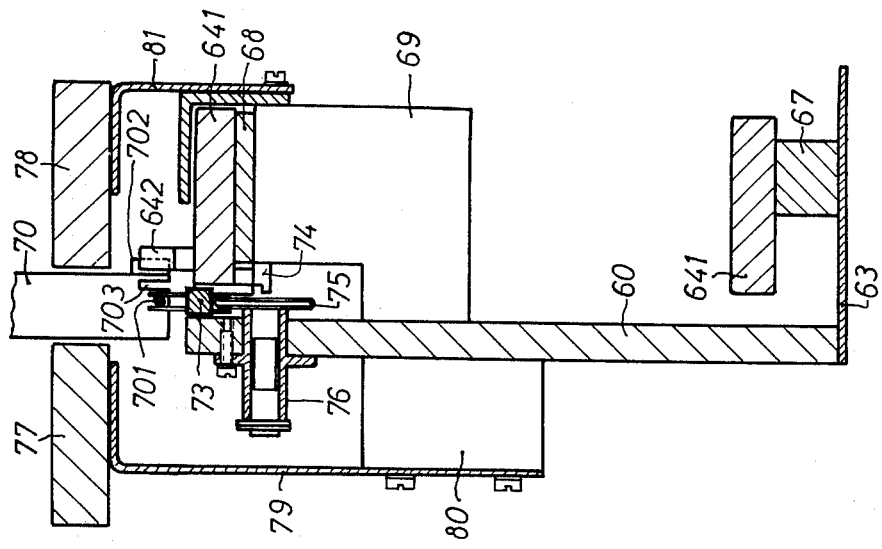
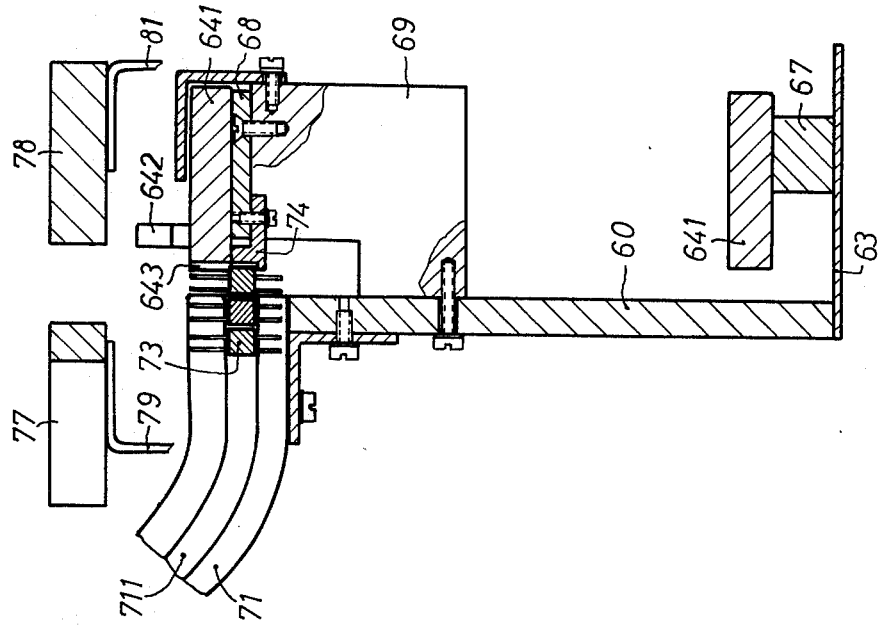

ELECTROPLATING DEVICE AND METHOD FOR THE PARTIAL PLATING OF TWO-ROW PIN STRIPS

BACKGROUND OF THE INVENTION

1. Field of the Invention

This invention relates to electroplating devices and more particularly to a mechanism for automatically attaching two-row pin strips, portions of which are to be plated, to a transfer carriage device which will move them through a succession of treatment areas to a point where they will automatically be removed from the transfer device.

2. Prior Art

This invention deals with an electroplating device which utilizes an electrical contacting transfer carriage for the removable carrying of items which are to be partially plated and wherein at least one treatment bath is positioned along the path followed by the transfer carriage, the treatment bath having end walls with slots therein for passage of the items attached to the transfer carriage.

Electroplating devices of this type have been disclosed, for example, in German Offenlegungffschrift No. 1,796,017. In such prior constructions, the items which are to be partially electroplated, for example, relay springs and the like, are passed through one or more elongated treatment baths, the items being suspended from electrically conductive transfer carriages. Only those areas of the items which are to be plated are actually dipped into the corresponding treatment liquids. In order for the items to be moved through the various treatment liquids at a uniform level, i.e. at a constant liquid penetration depth, the end walls of the treatment baths contain slots through which the items may pass. Treatment bath liquid levels are maintained by the use of circulation pumps which continuously pump back into the treatment baths the liquids which flow out through the end wall slots.

In prior constructions, the items which were to be electroplated were hung by hand from the transfer carriages. The transfer carriages were normally guided by means of appropriately designed roller members on a cathode rail fixed above the treatment baths. After passing through the individual treatment baths, the electroplated items were then removed from the carriages by hand. Thus fully automatical electroplating did not exist. Also, such prior devices were not suitable for the partial plating of two-row pin strips because of difficulties which arise in properly electrically conductively contacting the individual pins. For example, in the course of electroplating a pin strip, if just one pin in the strip was not properly electrically conductively contacted or grounded, then the entire pin strip would have to be scrapped or subjected to an expensive further treatment. This problem is extremely difficult to overcome even by using complex methods of individually grounding the pins because the conductive electric contact elements of the carriages are under the influence of the treatment liquids which are either strongly acidic or strongly basic and thus have a tendency to form an oxid skin on the conductive elements.

It would therefore be an advance in the art to provide a fully automatic electroplating device for the partial plating of two- row pin strips in which reliable electric contact of each of the pins is guaranteed.

SUMMARY OF THE INVENTION

It is therefore the object of this invention to provide a fully automatic device and method for partial electroplating of two-row pin strips in which the pin strips are automatically attached, in electrically conductive contact, to carriage members which move them through electroplating treatment areas and in which the pin strips are automatically removed from the carriage members upon completion of the process.

In accordance with the teachings of this invention, this object is acheived by using an electroplating device of the type described above wherein the electrically conductive contacting and transfer carriages are equipped with enclampment bars designed to receive the two-row pin strips. In order to form an horizontal endless conveyor, the transfer carriages are articulatably connected together. At a position along the closed loop path followed by the conveyor, an automatic loading device is provided which will clamp the two-row pin strips in position on the enclampment bar. At a further point along the path, a stripping device is provided which will remove the pin strips from the carriages.

At a point along the closed loop path which is prior to the first treatment stage, the pin strips are pressed onto the enclampment bars by means of an automatic loading device. Both the electrical contact of the individual pins with the carriages and the attachment of the pin strips to the carriages are accomplished at the same time by a clamping action which takes place between the two parallel rows of pins in the pin strip and the intermediately positioned enclamping bar. A surprisingly high functional reliability occurs with this simple clamping contact. This is due to the fact that the relatively sharp edges of the individual pins will rupture any oxide layer on the enclamping bars during the loading operation.

After passing through the last treatment stage, the pin strips can be pulled off the enclamping bars through the use of a stripper device. In addition to fully automatic electroplating of such pin strips, this invention enables the use of compact, space saving, positioning of the treatment baths due to the closed path followed by the items to be plated.

Preferably, the endless conveyor chain formed by the articulated succession of transfer carriages will be guided by means of two polygonal wheel members, the wheel members having an edge length which is matched to the length of the individual carriages. One of the wheels can be driven by a drive system. In the embodiment illustrated, the chain of transfer carriages is made to undergo a 180° direction change around the polygonal wheels so that two parallel straight sections of the path followed by the items to be electroplated will be formed. In the straight areas of the endless path, the distance between the anodes fixed in the treatment baths and the moving pin strips can be maintained constant while at the same time, the relatively short zones in which the change of direction takes place around the polygonal wheels can be used for treatment stages which do not involve the use of an electric current.

In the preferred embodiment, carbon brushes may be fitted to the carriages, which brushes, locally at least, are in contact with a fixed cathode rail or rails. In this way, low and constant electrical resistence can be maintained.

In the preferred embodiment of the electroplating device, according to the teachings of this invention, enclampment bars of circular cross section are utilized. The diameter of the bars is preferably slightly larger than the space between the parallel rows of pins in a given pin strip. The use of bars of circular cross section facilitates the elastic expansion of the pin rows when the pin strips are clamped in position on the bar.

Enclamping bars which are made of a nickel-crome steel, preferably with a molybdanum content in the alloy for stability purposes, are suitable for this application because they are highly resistent to the corrosive treatment baths.

In accordance with this invention the automatic feed device consists of a feed element or magazine, a vertically oriented driving belt which can be driven synchronously with the transfer chain, and a plurality of pressure rollers. The pressure rollers form a roller track which rises towards the path to be followed by the items to be plated. The individual pin strips slide along the feed magazine onto the drive belt and are then pressed by the inclined roller track without being damaged onto the enclamping bars of the electric contacting and transferred carriages. If the contacting and transfer carriages are provided with drive elements which engage corresponding elements of the drive belt of the feed device then the requisite synchronism between the feed device and the endless transfer chain will be maintained.

In the preferred embodiment, the stripper device may be a simple strip wedge having an acute apex angle which is positioned in the path of the endless transfer chain. Thus the strip wedge will contact the pin strip and force them downwards out of contact with the enclamping bars in a manner which will prevent their being damaged.

It is therefore an object of this invention to provide a method and apparatus for partially electroplating two-row pin strips through the use of a closed path continuous chain of articulated together transfer carriages which move the items to be plated through a succession of treatment areas, the carriages including electrically conductive enclamping bars onto which the pin strips are feed in frictional enclampment therewith by an automatic feed device and from which the pin strips, after plating are stripped.

It is another and more particular object of this invention to provide a method of attaching two-row pin strips to transfer carriages in electrically conductive relationship therewith by an automatic feeding device, the carriages being equipped with enclampment bars and the pin strips being feed from under the enclampment bars onto the bars automatically with the pins in each row lying on opposite sides of and contacting the enclampment bar, the bar having a diameter slightly greater than the normal space between the pin rows.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a schematic view of an electroplating device for the partial gilding of two-row pin strips.

FIG. 2 is a fragmentary side view, partially in section, of the electroplating device of FIG. 1.

FIG. 3 is a cross sectional view of the device of FIG. 2.

FIG. 4 is a side plan view, partially in section and with underlying portions shown by broken lines of a pin strip loading and stripper device.

FIG. 5 is a cross sectional view taken along the lines V—V of FIG. 4.

FIG. 6 is a cross sectional view taken along the lines V—V of FIG. 4.

FIG. 7 is a fragmentary cross sectional view illustrating a modification of the enclampment of the pin strips to the transfer carriages.

DESCRIPTION OF THE PREFERRED EMBODIMENTS

FIG. 1 is a schematic view illustrating a layout for performing the sequence of steps necessary in the partial plating of two-row pin strips by movement of the same through a succession of individual treatment stages. The pin strips consist of a synthetic material body which has two rows of pins embedded therein in such a manner that the pins project from opposed sides of the body. Normally, the electrodeposition of gold is done only on the plug side of the pin strips. It is the plug side which is critical in the electrical contact function utilizing the pin strip.

In the fully automatic electroplating operation according to this invention, the pin strips are inserted into a feed magazine 1 of a loading device 2. The loading device 2 then clamps the pin strips onto enclamping bars formed as a part of transfer carriages 3. Subsequently, the pin strips attached to the transfer carriages pass successively through treatment stations 4–18 and are then removed from the enclamping bars by a stripper device 19. The path followed by the pin strips is preferably along a closed loop as indicated by broken line 20. In order for continuous transfer of the items through the path to occur, the transfer carriages 3 are attached to one another by hinges 21 to form an endless transfer chain. Guidance of the transfer chain is by means of two polygonal wheels 22 and 23. The length of the individual edges of the polygonal wheels is matched to the length of the individual carriages 3. In addition, the carriages 3 may be guided in the straight sections of the transfer path 20 by means of rollers carried by the carriages which ride on rails 25 and 26. The entire transfer chain may be driven by one of the polygonal wheels, such as the wheel 22 which may be connected through a chain or other drive 27 to an infinitely variable motor 28. Through the use of such a variably motor 28, transfer speeds ranging from between 45 and 120 centimeters per minute can be provided.

FIGS. 2 and 3 are respectively longitudinal and cross sectional views of a portion of the electroplating device. In FIG. 2 three successive treatment baths 29, 30 and 31 are shown through which the pin strips 32 are passed. During transit, the pin strips 32 hang down from the electrically conductive contacting and transfer carriages 33 which are attached together into the endless chain by means such as hinges 34, which are not shown in detail. Each of the individual transfer carriages 33 are guided on a rail 37 by means of rollers 35 and 36. Each carriage is equipped with a pin strip holder 38 designed to carry two pin strips 32. Because each pin in the strip must be in electrical contact to complete the circuit, the pin strip holders 38 are equipped with enclamping bars 39 which are constructed of corrosion resistent nickel-crome steel which contains molybdanum in the alloy for stability reasons (X5CrNiMo 18 10). The bars 39 have diameters slightly larger than the interval between two rows of pins in the pin strips 32. Electrical contact occurs at the time of loading the pin strips onto the enclampment bars 39 as a result of the clamping action between the two rows of pins and the interveningly positioned enclamping bar 39. To further complete the circuit, the pin strip holders 38 are connected electrically with one another and are grounded through carbon brushes 40 and a cathode rail 41.

Each of the treatment baths 29, 30 and 31 may be of similar design. Therefore a description of the bath 30 can be taken as typical. The bath 30 consists of a base 301 two side walls 302 and two end walls 303. The base 301 and the side walls 302 project at both ends beyond the end walls 303 and terminate at oppositely disposed end walls 304 defining overflow chambers 305 and 306. In order for the pin strips 32 to be transported through the treatment bath 30 at a constant height with respect thereto, the two end walls 303 are provided with slots 307 for passage of the pin strips. Similar slot openings 308 are formed in the end walls 304. The treatment liquid 42 continuously flows through the slots 307 into the overflow chambers 305 and 306 and from those chambers through discharge lines 43 and 44 into a reservoir and buffer vessel 45. In order to maintain the level of liquid in the treatment bath constant, the liquid 42 is continuously pumped out of the reservoir and buffer vessel 45 through a suction line 46 to a variable delivery filter pump 47 and a delivery line 48 which discharges back into the treatment bath 30. To provide for electric current flow, plate anodes 49 suspended from anode rods 50, as illustrated in FIG. 3, may be employed in the treatment baths.

FIGS. 4, 5 and 6 illustrate respectively in plan and sectional view a combination loading and stripper device 2. The sectional views 5 and 6 have been enlarged two and one half times with respect to FIG. 4. The loading and stripper device includes a strong side wall 60, two ends walls 61 and 62 and base member 63. Within the housing defined by the walls, an endless drive belt 64 is provided which as individual segments 641, articulated to one another. The drive belt 64 extends around two rotatably mounted square guide members 65 whose axis 66 is attached to the side wall 60. In order to provide additional support to the drive belt 64, bottom 67 and top 68 slideways may be provided. The bottom slideway 67 is attached to the base 63 while the top slideway 68 may be attached to the side wall 60 by means of screws and angle brackets 69.

Angled transmission elements 642 are provided on the drive belt 64 at spaced intervals. These transmission elements engage corresponding driving elements on the transfer carriages which are to be loaded with pin strips. This insures that the speed of the transfer carriage and the drive belt 64 will be maintained identical. As is shown in FIG. 6, the transfer carriage 70, equipped with an enclamping bar 701, has a projecting wing drive element 702 contacting the transmission element 642 of the drive belt portion 641.

Loading of the pin strips is effected by use of a feed magazine 71 which is attached by brackets 72 to side walls 60. The feed magazine 71 consists of two slide portions each with a guide groove 711 made of a corrosion resistent low friction material, for example, stainless steel. The pin strips 73 are held in the guide grooves 711 at the ends and slide successively into opening 643 in the passing drive belt 64. Thereafter, they are moved onwards at the same rate as the transfer carriage 70. Underneath the magazine, the pin strips 73 are initially held by a guide plate 74 which may be carried by the slideway 68. After initial movement of the pin strips from the magazine area, lower guidance of the strips will be controlled by a succession of pressure rollrs 75, ten of which have been illustrated. The rollers engage the body of the pin strips between the depending pin rows and form an incline rising roller track. The axis 76 of the individual pressure rollers 75 are flange attached to the side wall 60.

As the pin strips 73 move over the pressure rollers 75 under the influence of the drive belt 64 and contact with the edges of the opening 643, they are continuously forced upward until, by the end of the track they are fully clamped onto the enclamping bar 701 of an aligned transfer carriage 70. For purpose of side guidance of the individual transfer carriages 70, guides 77 and 78 are provided, the guide 77 being attached by brackets 79 and spacers 80 to the side wall 60 while the guide 78 is attached by screws and brackets 81 to the angle brackets 69. A low friction synthetic material may be used for guides 77 and 78.

After passing out of the pin strip attachment portion of the loading device 2, and moving through the treatment area defined by the path 20, the resultant electroplated pin strip 73 will be withdrawn from the enclamping bars 701 by a stripper wedge 82 which has an acute apex angle. In order that the wedge 82, which may be attached to the side wall 61, can effectively engage the synthetic material body of the pin strip 73, openings 703 are provided in the carriages 70. After the stripping operation, the pin strips 73 drop into a chute 83 which may be attached to the end wall 61 and which may discharge to a bin or conveyor belt.

FIG. 7 illustrates, in cross section, a modification of the pin strip enclamping mechanism. In this modification, an enclamping bar 851 is shown in position between the pins of a pin strip 86. The enclamping bar 851 is wedge shaped in cross section to facilitate clamping in position of the pin strip. In addition, two electrically conductive contacting bars 87 are provided which are springloaded from the exterior towards the interior into contact with the pin rows of the strip 86. In this mechanism even if the individual pins of a pin strip have been previously bent or are not properly aligned, the contacting bars 87 will insure reliable electric contact of all of the pins.

Preferably, the electrical contacting bars 87 will be positioned for horizontal movement in "U"-shaped openings 852 in the pin strip holder 85 and will be held together at their respective axial ends by a spring member, for example rubber springs 88. The opening 853 illustrated in FIG. 7 is again designed to allow a stripper wedge to come into contact with the synthetic material body of the pin strip 86 to force the strip from the strip holder 85.

It can therefore be seen from the above that our invention provides a method and apparatus for automatically electroplating pin strips wherein the individual pin strips are automatically fed onto a transfer carriage in electrically conductive association therewith and are then moved through a succession of treatment baths for electroplating. After movement through the treatment baths, the pin strips are automatically stripped from the transfer carriage. It will be appreciated that by means of this invention it is assured that automatic loading of the pin strips will be obtained while at the same time insuring positive electric contact with each pin of the pin strips.

Although the teachings of our invention have herein been discussed with reference to specifice theories and embodiments, it is to be understood that these are by way of illustration only and that others may wish to utilize our invention in different designs or applications.

We claim as our invention:

1. In an electroplating device utilizing an electrically conductive contacting and transfer carriage for the detachable positioning and movement of items which are to be electroplated, the device including at least one treatment bath positioned along a line of transit followed by the carriage, the end walls of the treatment bath containing slots for passage of the items detachably carried by the carriage, the improvement of said carriages being equipped with electrically conductive enclampment bars adapted to receive two-row pin strips detachably thereon, the carriages being articulated together forming an endless chain moving through a closed loop, electric circuit means in operative contact with the enclampment bars for at least a portion of said loop, an automatic pin strip loading device positioned at one point along said loop, said loading device effective to load pin strips onto said enclampment bars in a position to be treated by said treatment bath upon movement of the carriages around said loop, said pin strips held on said enclampment bars by a friction press fit with the pins on one side of each of the strips in electrically conductive engagement with an enclampment bar and an automatic stripper device positioned at a point along said loop on an opposite side of said treatment bath from said loading device in the direction of movement of the carriages, the stripper device effective to remove pin strips from said enclampment bars.

2. The improvement of claim 1 wherein the chain of transfer carriages is received around and extends between two polygonal wheels having edge lengths equal to a length of the individual transfer carriages, one of said wheels being driven by a notive source.

3. The improvement of claim 2 wherein carbon brushes positioned on said transfer carriages are in contact with a fixed cathode rail for at least portion of their travel along said loop.

4. The improvement of claim 1 wherein the enclamping bars have an at least partially circular cross section area with a diameter slightly larger than a space between rows of pins in a two-row pin strip to be plated.

5. The device of claim 4 wherein the enclamping bars are constructed of nickel-chrome steel having molybdanum in the steel alloy.

6. The improvement of claim 1 wherein the loading device includes a feed magazine adapted to receive a plurality of two-row pin strips, a drive belt driven synchronously with the transfer carriage chain, and a plurality of pressure rollers, the rollers forming a roller track which inclines from a magazine discharge level towards a level at which the enclamping bars pass the loading device.

7. The device of claim 6 wherein the transfer carriages include driving members indexable with driven elements on the loading device drive belt as the transfer carriages pass the loading device, whereby the loading device drive belt will be driven by movement of the transfer carriages.

8. The improvement of claim 1 wherein the stripping means comprises a wedge member having an acute apex angle positioned in the path of movement of the carriages around said loop, the wedge being positioned at a level to contact pin strips carried by the enclamping bars and to remove them from the enclamping bars.

9. The method of electroplating two-row pin strips comprising: providing an endless chain of articulatively joined together transfer carriages, driving said chain to move said carriages through a closed loop, positioning a plurality of successive treatment baths along said loop, below said carriages, providing said carriages with electrically conductive enclampment bars at a level above bottoms of said treatment baths whereby items carried by said enclampment bars will pass through said treatment baths, providing slots in end walls of said treatment baths for passage of said items to be electroplated, providing a pin strip loading device having an endless pin strip driving belt therein, positioning said loading device along the path of movement of the said carriages, contacting the said driving belt by said carriages to move said driving belt, contacting pin strips from a magazine in said loading device by said driving belt, moving the said pin strips from a magazine level to a carriage enclamping bar level by said drive belt in response to movement of said carriage past said loading device, enclamping said pin strips on said enclamping bars by a friction press fit with the pins on one side of each of the strips in electrically conductive engagement with an enclampment bar by said loading device in electrically conductive contact between each pin of said pin strip and enclamping bars, moving said carriages around said path with said pin strips enclamped to said enclamping bars and projecting therefrom to a level to pass at least portions of said pin strips through said slots and be treated in said treatment baths, providing electric contact to said enclampment bars, at points along said path to close a circuit through said baths, the circuit including the pins of each pin strip passing through said baths, and stripping said pin strips from said enclampment bars at a point along said path remote from said loading device in the direction of movement of the carriages.

10. A device for automatically electroplating two-row pin strips comprising: an endless chain of articulatedly attached together carriage members, said chain passing around and between two polygonal wheels, drive means attached to one of said wheels for moving said chain, at least portions of said chain suspended above a plurality of treatment baths at a constant level with respect thereto, slots in end walls of said treatment baths for passage of items to be electroplated, plating liquid in said treatment baths, at least some of said carriages having enclampment bars depending therefrom, automatic pin strip loading means positioned along the path followed by said carriages said automatic loading means including magazine means for storing a plurality of pin strips to be electroplated, a pin strip moving drive belt in said loading means for moving said pin strips from said magazine, pin strip level changing means in said loading means moving said pin strips from a first level of said magazine spaced from a second level of passage of the enclampment bars passing the loading device to a third level adjacent said second level of enclampment bars passing said loading device, means moving said pin strip drive belt means synchronously with movement of said carriages, and guide means in said loading device effective to align said pin strips with said enclampment bars passing said loading device, said level changing means effective to force said pin strips into frictionally clamped electrically conductive relationship with said enclamping bars at said second level with at least some of said pins having portions to be electroplated depending from said enclamping bars a distance sufficient to pass through said slots into said treatment baths in contact with said liquid along the path of movement of said carriages effective to strip plated pin strips from said enclampment bars.

* * * * *